UNITED STATES PATENT OFFICE.

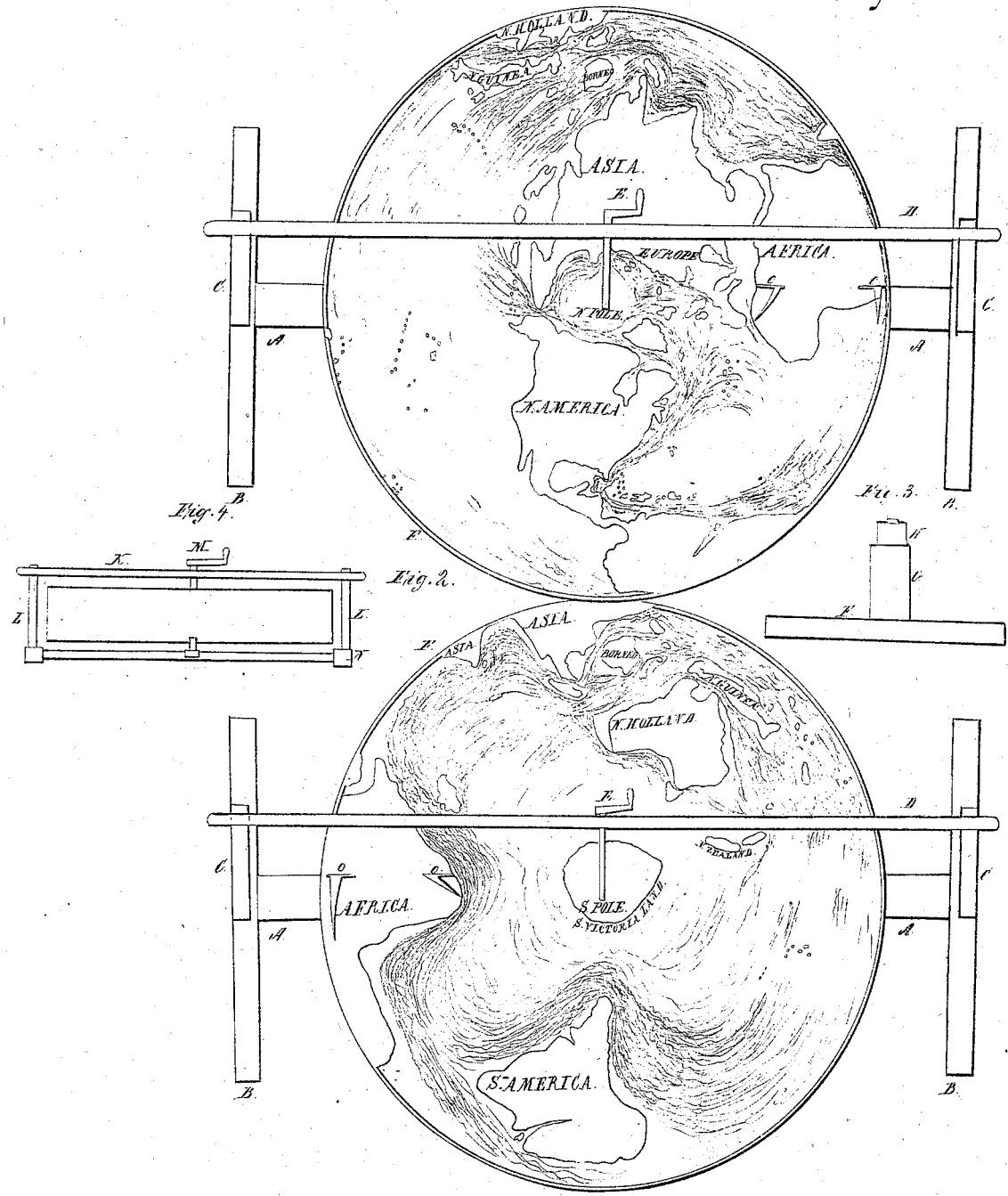

BENGN. F. WATTS, OF RANDOLPH COUNTY, GEORGIA.

REPRESENTATION OF TIDES AND CURRENTS.

Specification of Letters Patent No. 3,248, dated September 1, 1843.

*To all whom it may concern:*

Be it known that I, BENJAMIN FRANKLIN WATTS, of the county of Randolph and State of Georgia, have invented a new and useful philosophical machine for the purpose of illustrating the phenomena of the tides and the currents of the ocean, seas, &c., heaping up of the waters on the east side of all the continents, islands, &c., reducing them on the west side and illustrating the trade-winds, &c.; I do hereby declare that the following is a full, clear and exact description.

The nature of my invention consists in having two round wheels flattened on the top and bottom with a rim around the edge so as to hold water, which wheels turn on a pivot in the center by means of a crank at the top, which crank is steadied by a frame. On said wheels is laid off Europe, Asia, Africa, and North and South America and New Holland and all the islands of the oceans according to their respective latitudes and longitudes as shown on the map of the world on a polar projection. The part representing the oceans, seas, &c., are hollowed out so as to contain water up to the edge of the plain surface and which plain surface is a representation of the continents, islands, &c., which continents, islands, &c., are layed off on said wheels according to their respective latitudes and longitudes precisely as shown on the map of the world on a polar projection. One of said wheels represents the North Pole and the other represents the South Pole. The North Pole shows several degrees of latitude south of the Equator and the South Pole shows several degrees of latitude north of the Equator.

I will now describe the machine by drawings and references by letters.

In Figure 1 and Fig. 2 in the accompanying drawings, which makes a part of this specification, is shown a plan of said machine. The letters will refer to both drawings, Fig. 1 and Fig. 2.

Both A A is the bottom piece that supports the ink and pivot on which the machine turns.

B B are two cross pieces at the bottom for the purpose of steadying the frame at bottom.

C C are two upright posts. The upper cross piece D is the upper cross piece that supports the shaft on which the machine turns.

E is the crank on the upper end of the shaft by which the machine is put in motion.

F is the rim bent around the wheels for the purpose of holding the waters on the part of the wheels representing the oceans, &c., which stand an inch higher than the plain surface which represents the continents.

O O are the flags for representing the trade winds. The continents and large islands are named in their proper places on the drawing precisely as shown on the map of the world. The small islands stand in their proper places on the drawing as shown on the map of the world. The blue streaks on the part representing the ocean show the general westward motion of the waters around the globe making currents at the most confined places such as between New Holland and Asia and at the Cape of Good Hope and Cape Horn and Cape Florida. The blue marks across Africa and South America on Fig. 1 are cuts for the waters to get pent from one ocean to the other.

Fig. 3 is a section of one of the frames in good view. F is the bottom cross piece that steadies the frame on the floor. G is the upright post that holds the upper cross piece steady; H, the end of the upper cross piece.

Fig. 4 is a section in side view of one of the frames with one of the machines in it complete. I is the bottom piece that supports the ink and water end of the shaft on which the machine turns in a horizontal manner; J, the rim that holds the waters in their place; K, the upper cross piece that supports the upper end of the crank. L L are the two upright end pieces that support the top cross piece. N N is the end of the bottom cross piece that steadies the frame on the floor or bottom; M, the crank by which the machine is put in motion. If the machine is filled with water near the edge of the plain surface and then put in motion with the eastern part of the continent running to the east the waters will resist the motion of the continent, and will heap up on the east side of all the continents and by the same resistance will be reduced on the west side of the continents. This gives a gradual declivity from the Equator on the east side all the way around the southern capes back to the Equator on the west side of the continents and the currents follow the declivities around the continents. The waters between the continents have a tendency to leave the western shores and heap upon the eastern shores of all the continents or the continents move faster than the waters. This makes the westward currents across the oceans. The Gulf Stream is the effect of the waters being heaped up at the Equator to a greater height because the velocity is greatest at that place. This gives a declivity northward which the stream follows. The tides are caused by the waters heaping upon the east side of the Continent of America to a higher level than it can maintain by that resistance that water has to the motion of the machine and when it starts the other way it goes lower than it can maintain and by this means the tides commence and continue while the machine is kept in motion. As the machine is put in motion in a horizontal manner the tides will ebb and flow and the waters will take a general westward motion around the globe making currents at the most confined places, such as between New Holland and Asia, at the Cape of Good Hope and Cape Horn and Cape Florida, also making counter currents in the mouth of rivers, bays, &c., by means of the tides. At the same time the waters will be heaped up on the east side and reduced on the west side of all the continents, islands, &c., while the flags will illustrate the trade winds. The flag near the Equator will straighten by its velocity passing through the air while the one near the pole will fall for want of velocity through the air.

What I claim as my invention and desire to secure by Letters Patent, is—

The method of illustrating the phenomenon of the tides and the currents of the ocean and the heaping up of the waters on the east and reducing them on the west side of the continents by means of rotating wheels or troughs, having the elevations of the land constructed on the plain surface thereof and the depressions of oceans, seas, &c., hollowed out to contain water, so that by the rotation of these the course of the tides and the currents of the ocean and heaping up of the waters, &c., will be represented.

In witness whereof I have hereunto set my hand this the 11th day of August in the year of Our Lord one thousand eight hundred and forty-three.

B. F. WATTS.

Witnesses:
G. W. CASTLEBERRY,
WILLIAM CASTLEBERRY.